April 12, 1966   F. N. STEPHENS ETAL   3,245,202
BOX LIDDER
Filed April 16, 1964   8 Sheets-Sheet 3
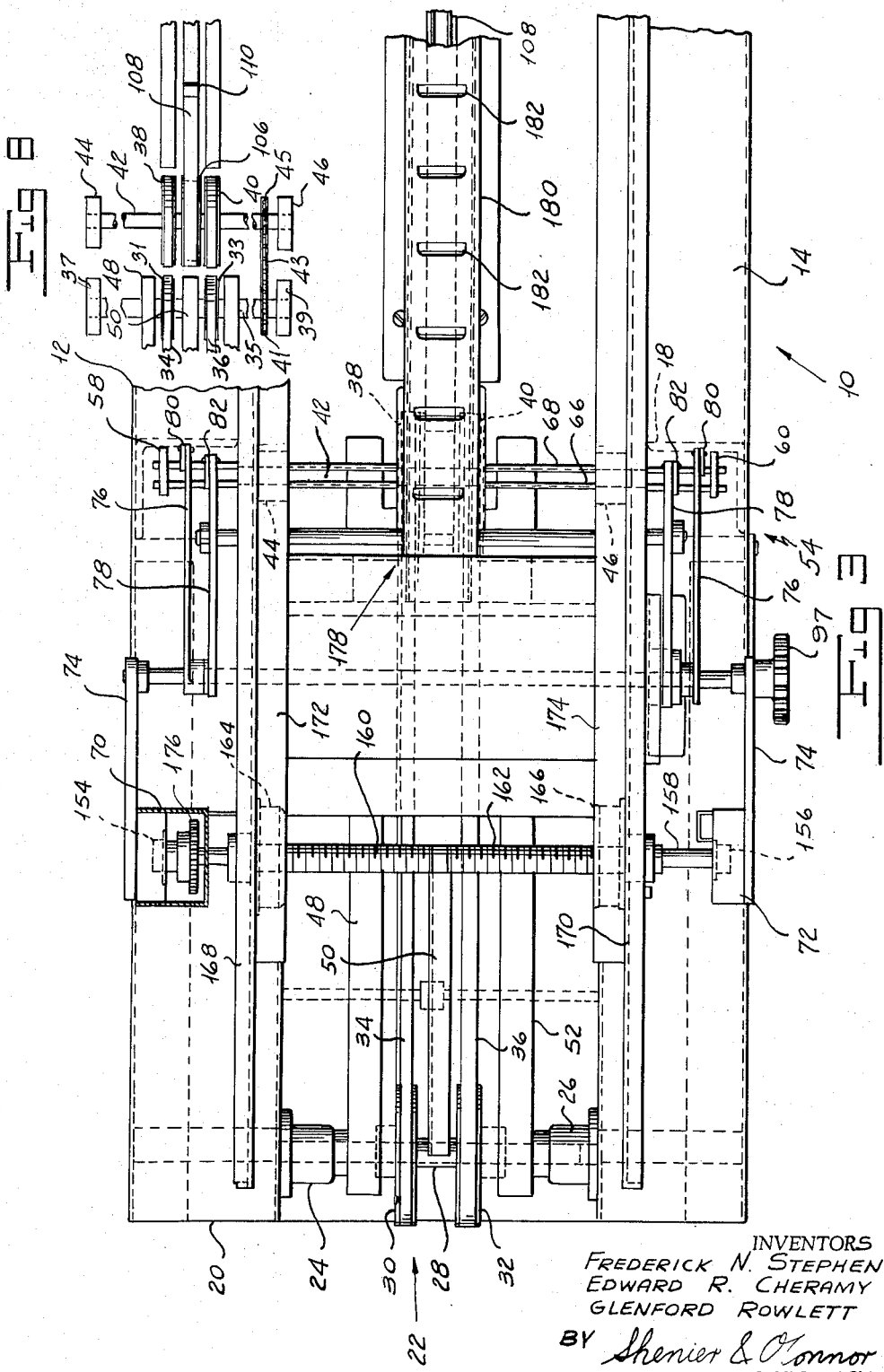
INVENTORS
FREDERICK N. STEPHENS
EDWARD R. CHERAMY
GLENFORD ROWLETT
BY *Shenier & O'Connor*
ATTORNEY

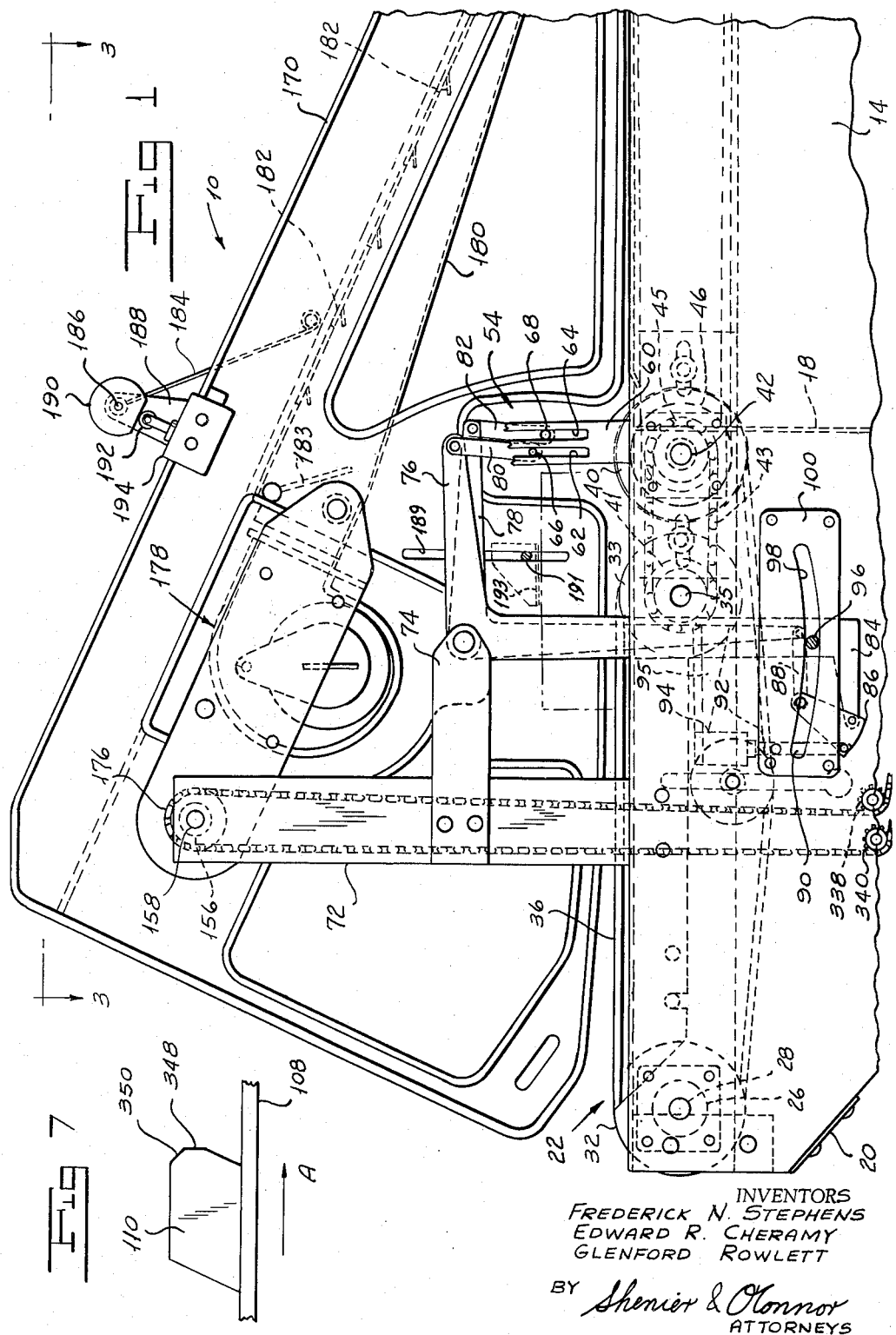

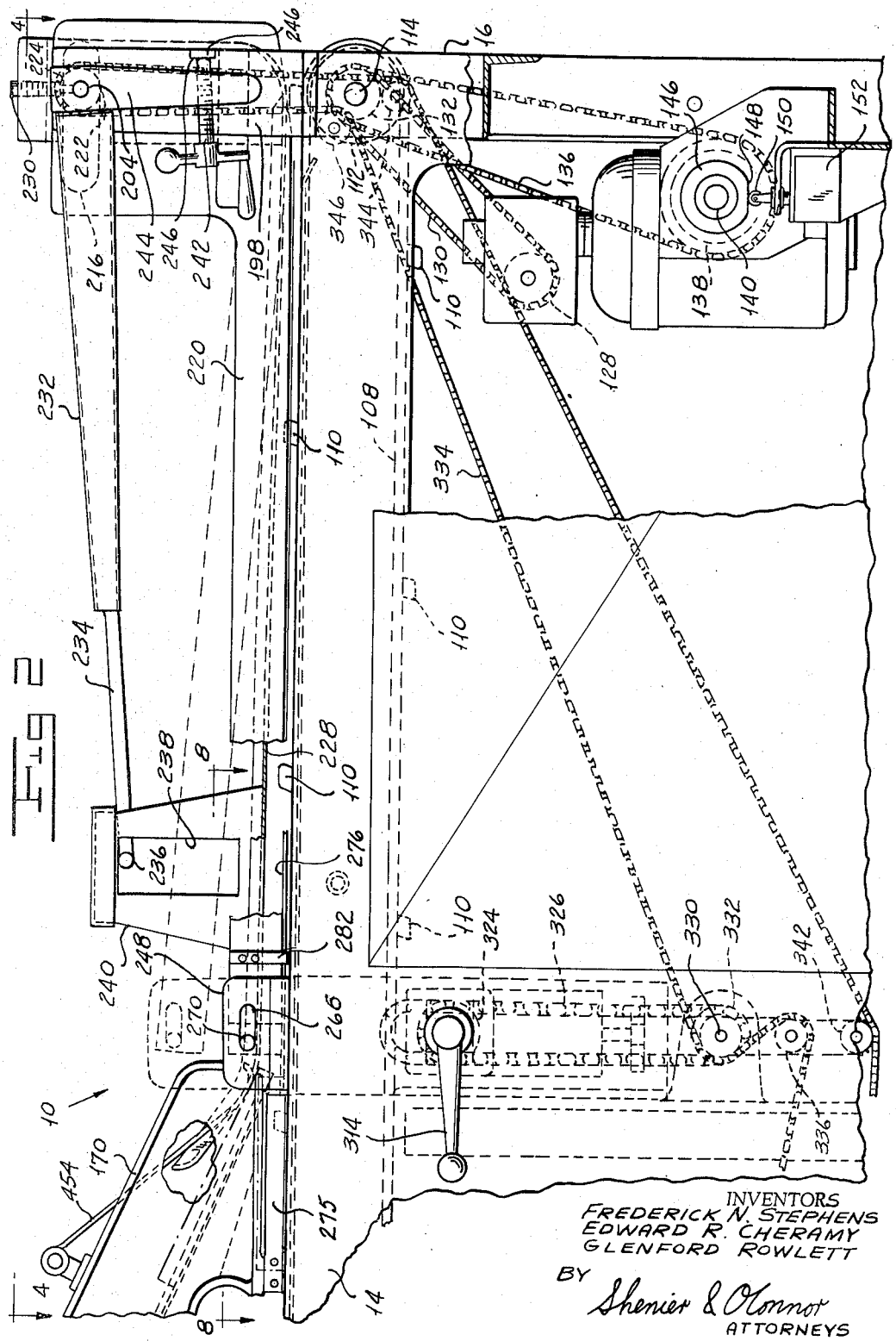

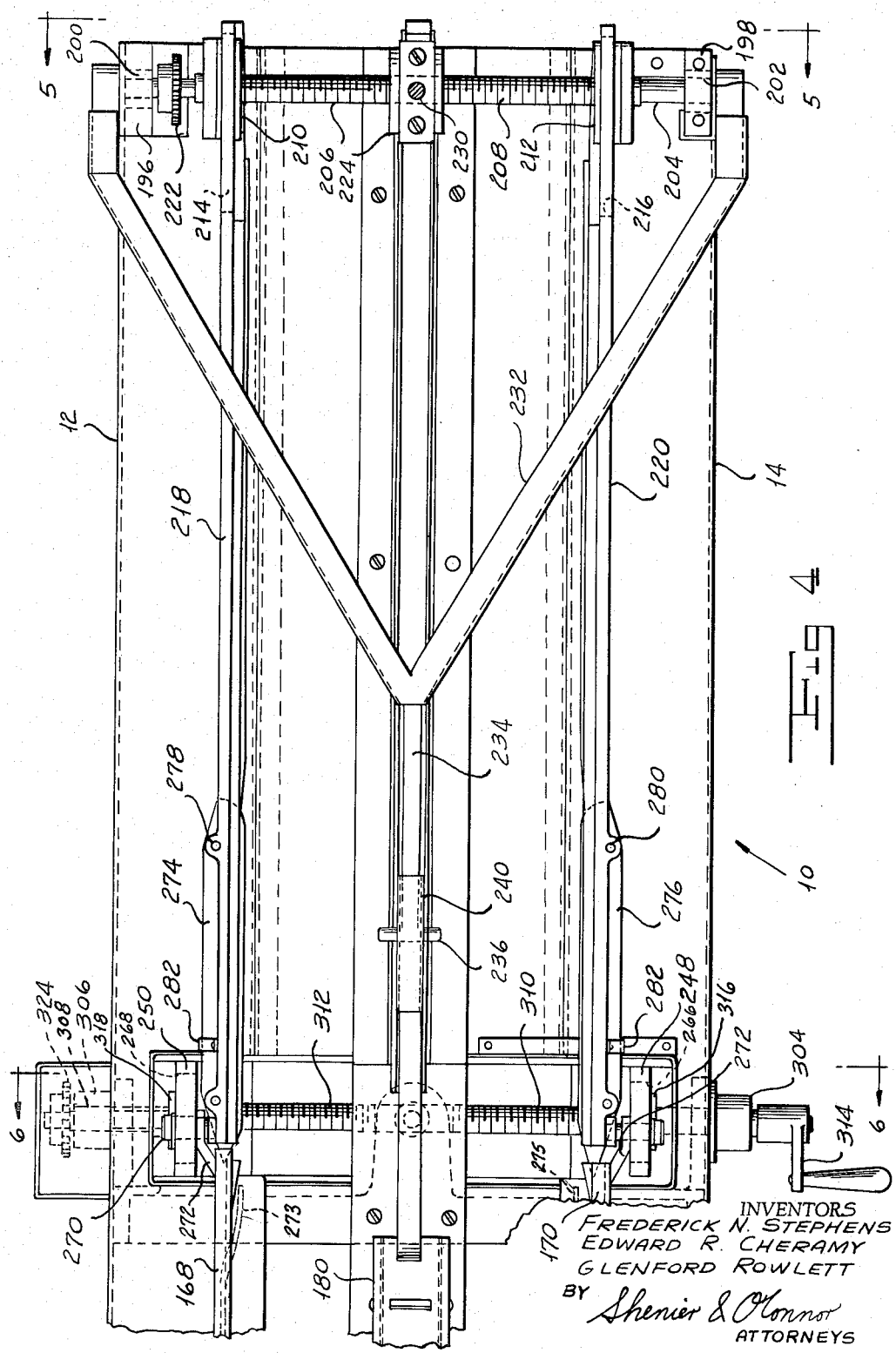

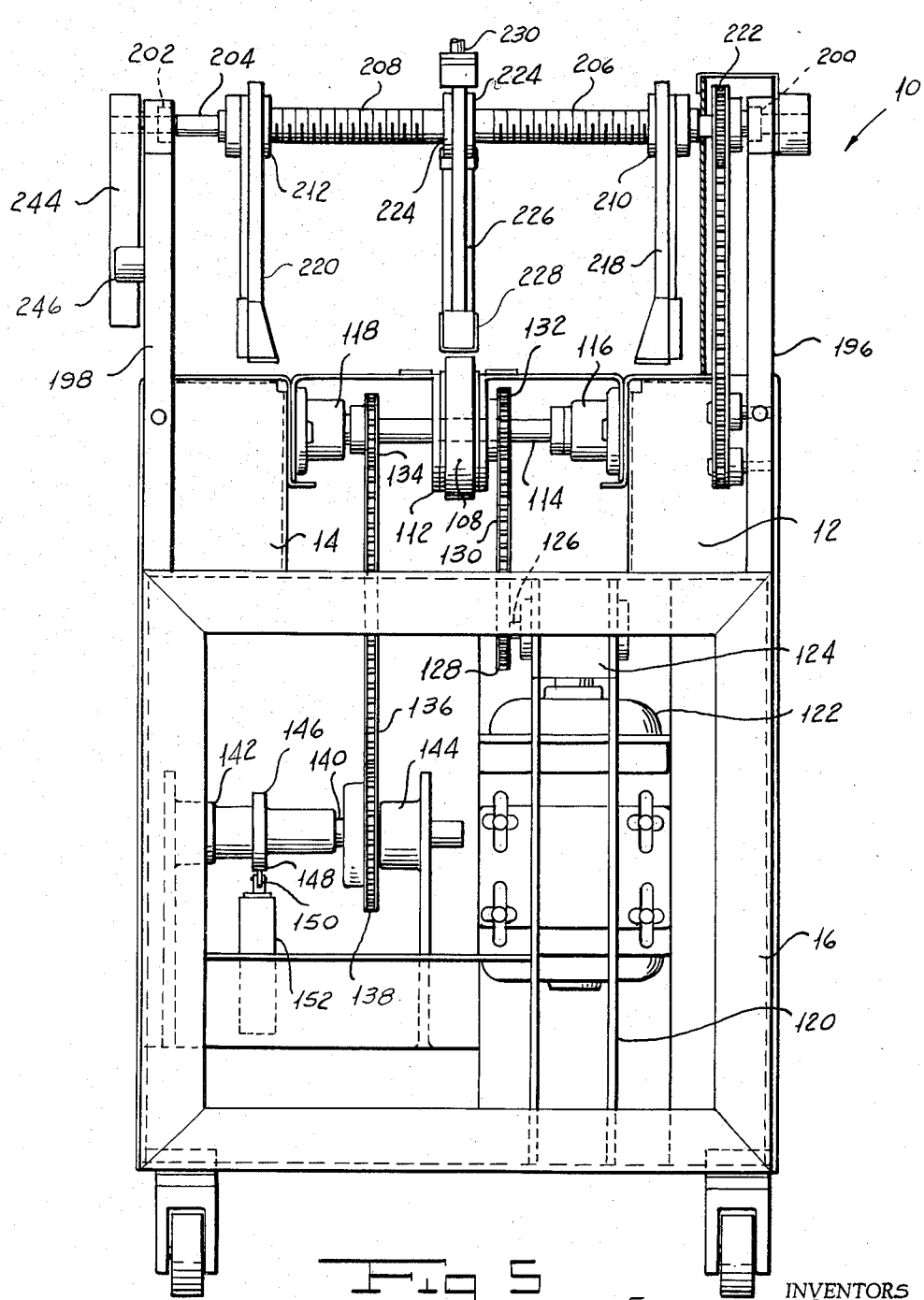

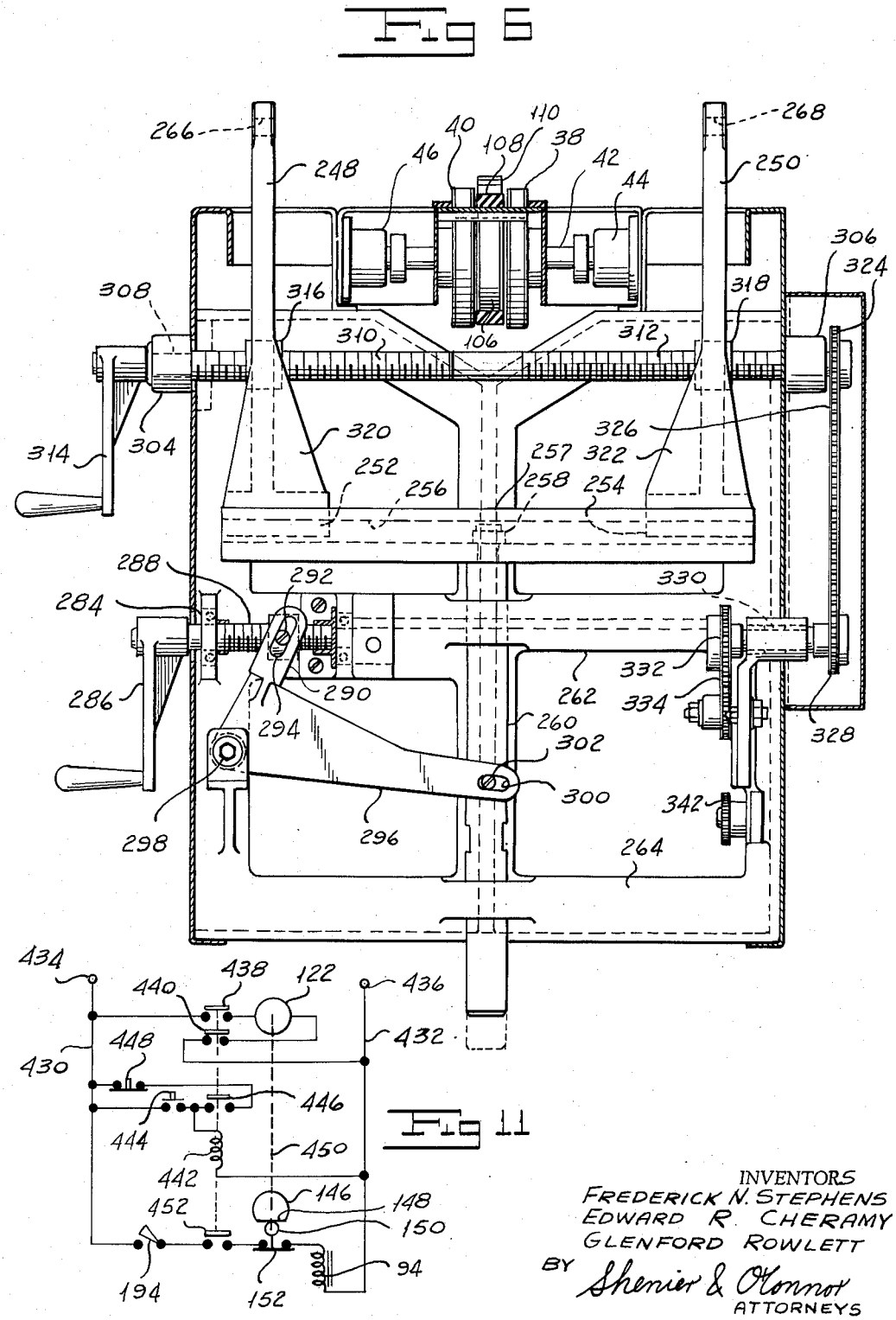

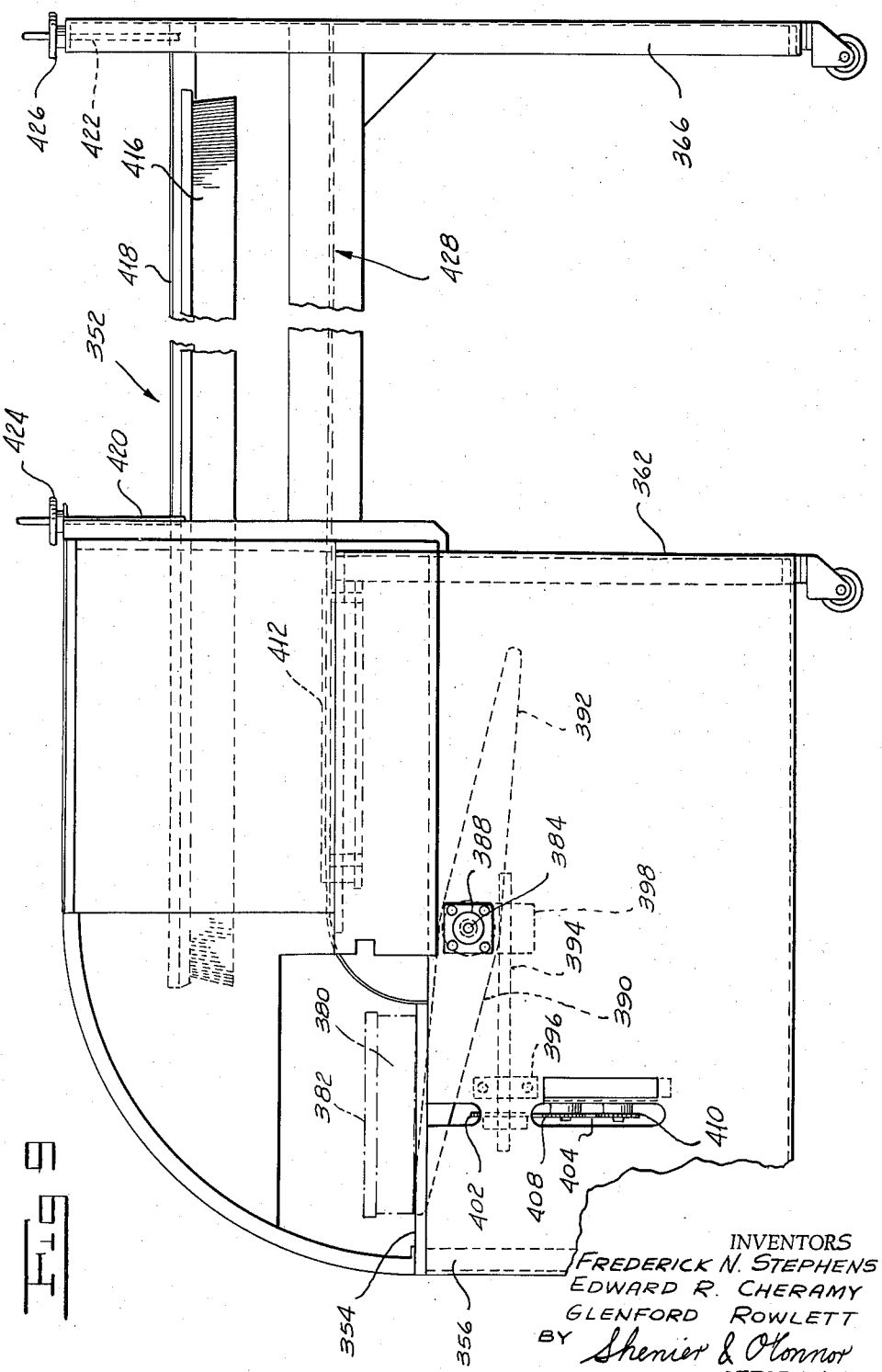

April 12, 1966   F. N. STEPHENS ETAL   3,245,202
BOX LIDDER
Filed April 16, 1964   8 Sheets-Sheet 8
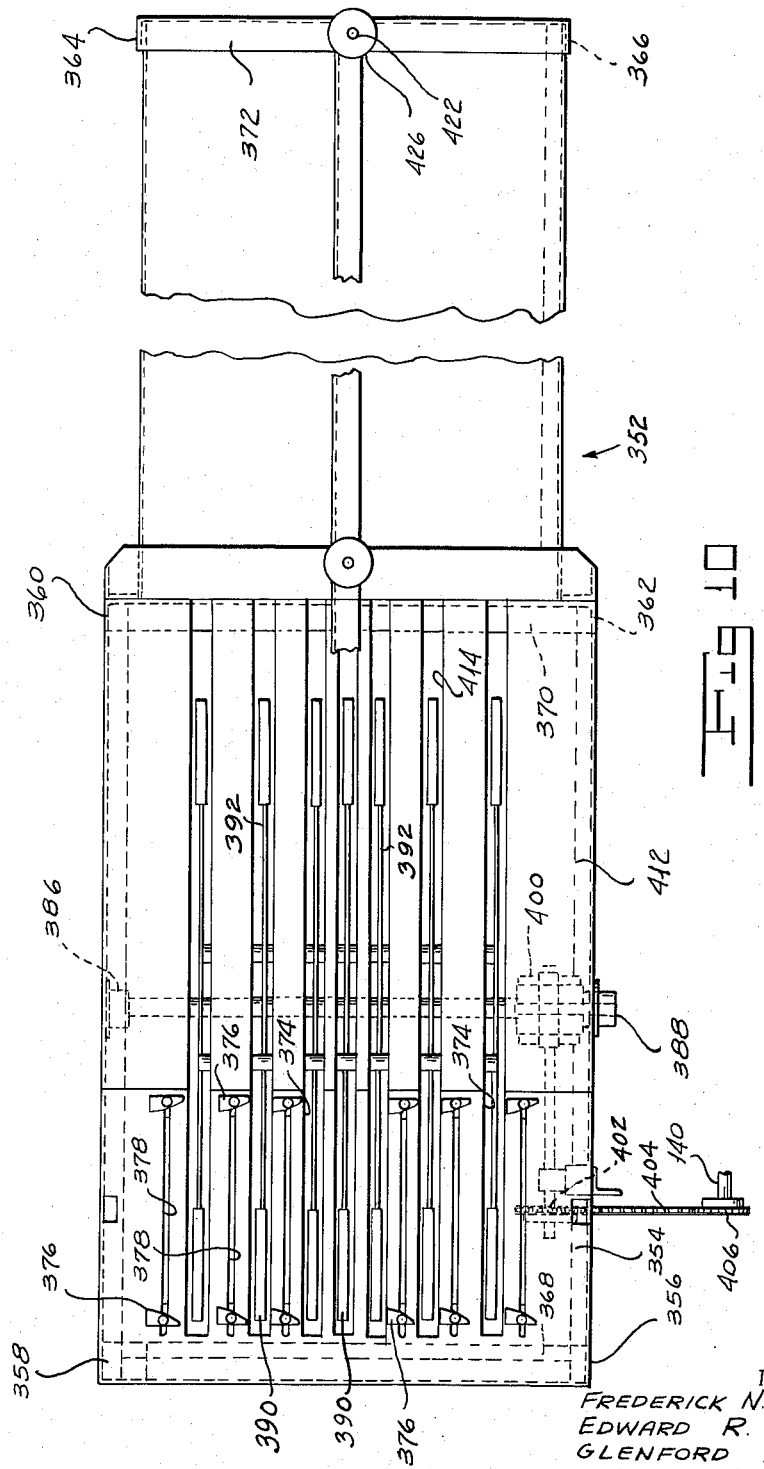
INVENTORS
FREDERICK N. STEPHENS
EDWARD R. CHERAMY
GLENFORD ROWLETT
BY Shenier & O'Connor
ATTORNEYS United States Patent Office 3,245,202
Patented Apr. 12, 1966

3,245,202
BOX LIDDER
Frederick N. Stephens, Leawood, Kans., Edward R. Cheramy, Kansas City, Mo., and Glenford Rowlett, Prairie Village, Kans., assignors to Stephens Industries, Inc., Kansas City, Mo., a corporation of Missouri
Filed Apr. 16, 1964, Ser. No. 360,197
22 Claims. (Cl. 53—315)

This application is a continuation-in-part of our copending application Serial No. 197,708, filed May 25, 1962, now abandoned.

Our invention relates to a box lidder and more particularly to a high speed apparatus for assembling lids on box bottoms and delivering them oriented so that they can readily be picked up for subsequent handling.

One of the most difficult problems confronting a manufacturer of articles such as shoes is that of packing the articles by pairs in boxes for shipment. After the shoes have been placed in box bottoms lids must be placed on the bottoms and the packed boxes are put in large cases or are delivered to an automatic tying or wrapping machine. In the prior art one operator manually places lids on bottoms while a second operator manually places the lidded boxes in cases or feeds them to the tying machines.

It has been suggested in the prior art that automatic equipment be provided which assembles lids on bottoms so that lidded boxes are supplied to the operator who places them in cartons or feeds them to the tying machine. These arrangements have not proved satisfactory for various reasons. First, the equipment is relatively complicated for the result achieved. Second, no provision is made for accommodating a range of box sizes. Moreover, these proposed box lidding systems are relatively slow in operation so that they do not provide an appreciable advance over the manual operations required in the prior art. In addition, a bottom and lid which have a minor defect cannot properly be assembled by this machinery and may interfere with the operation thereof.

We have invented a box lidder which eliminates one of the manual operations usually employed in the prior art. Our lidder overcomes the disadvantages of lidders of the prior art pointed out hereinabove. Our apparatus is capable of very high speed operation so that full advantage can be taken of the speed of operation of automatic equipment which delivers box bottoms for lidding. Our lidder ensures that a complete assembly of a bottom and lid is delivered. Minor imperfections in bottoms and lids will not interfere with proper operation of our equipment. Our box lidder is readily adjustable to accommodate a wide range of box sizes. The delivery mechanism of our box lidder orients the lidded boxes in an ideal position for subsequent handling.

One object of our invention is to provide a box lidder which assembles lids on bottoms in a rapid and expeditious manner to eliminate one manual operation required in the prior art.

Another object of our invention is to provide a box lidder which greatly facilitates the operation of packing articles in boxes.

Still another object of our invention is to provide a box lidder which can accommodate a wide range of box sizes.

A further object of our invention is to provide a box lidder the operation of which is not affected by minor imperfections in the bottoms and lids.

A still further object of our invention is to provide a box lidder which presents lidded boxes in an ideal orientation for subsequent handling.

Yet another object of our invention is to provide a box lidder in which the release of a bottom to be assembled with a lid is synchronized with the movement of a driving conveyor.

A still further object of our invention is to provide a box lidder having means for preventing shingling of bottoms being received by a drive conveyor.

Other and further objects of our invention will appear from the following description.

In general our invention contemplates the provision of a high speed lidding apparatus in which a bottom carried by a first conveyor normally is prevented from moving onto a driving conveyor by an escapement mechanism. When a lid is properly positioned for placement on the bottom in response to the drive of the drive conveyor, the bottom is released to permit it to move onto the driving conveyor in timed relation therewith so as to be picked up by a pusher on the drive conveyor to move the bottom into engagement with the lid to draw the lid along with the bottom. As the lid moves along with the bottom, the sides of the bottom are squeezed to facilitate movement of the lid over the bottom as it moves under the top lid guide. Our lidder is provided with means for rapidly and expeditiously adjusting the parts to accommodate boxes of different sizes. We provide our machine with means for preventing a following bottom from moving under a bottom being transferred to the drive conveyor when shallow boxes are being handled.

In the accompanying drawings which form part of the instant specification and which are to be read in conjunction therewith and in which like reference numerals are used to indicate like parts in the various views:

FIGURE 1 is a fragmentary side elevation of the end of our box lidding apparatus which receives bottoms and tops to be assembled.

FIGURE 2 is a fragmentary side elevation of our box lidding apparatus showing the portion of the apparatus wherein bottoms are assembled with tops.

FIGURE 3 is a fragmentary top plan view of our box lidding apparatus taken along the line 3—3 of FIGURE 1.

FIGURE 4 is a fragmentary top plan view of our box lidding apparatus taken along the line 4—4 of FIGURE 2.

FIGURE 5 is an end elevation of our box lidding apparatus illustrating the end at which lidded boxes are delivered.

FIGURE 6 is a sectional view of our box lidding apparatus taken along the line 6—6 of FIGURE 4.

FIGURE 7 is a fragmentary view of the driving conveyor of our lidding apparatus illustrating the configuration of one of the conveyor pushers.

FIGURE 8 is a fragmentary plan view of a portion of our box lidding apparatus illustrating the connection between the bottom feeding conveyor and the driving conveyor thereof.

FIGURE 9 is a side elevation of a packing table adapted to receive lidded boxes from our lidding apparatus.

FIGURE 10 is a plan view of the table shown in FIGURE 9 with parts broken away.

FIGURE 11 is a schematic view illustrating one form of electrical control circuit which can be employed with our lidding apparatus.

Referring to FIGURES 1, 3, 5 and 8 of the drawings, the box lidding portion of our apparatus, indicated generally by the reference character 10, comprises respective side walls 12 and 14 held in assembled relationship by a front frame 16, a rear frame 18 and a cross brace 20 secured to the portions of the walls 12 and 14 extending beyond the rear frame as viewed in FIGURE 1.

We provide our machine with a first conveyor indicated generally by the reference character 22 which receives box bottoms. Respective bearings 24 and 26 carried by the walls 12 and 14 rotatably support a shaft 28 carrying a pair of pulleys 30 and 32. V-belts 34 and 36 carried by the pulleys 30 and 32 extend around pulleys 31 and 33 carried by a shaft 35 rotatably supported in bearings 37 and 39 on the sides 12 and 14. Box bottoms fed to the conveyor 22 including the belts 34 and 36 are carried over guides 48, 50 and 52 toward an escapement mechanism indicated generally by the reference character 54. A sprocket wheel 45 carried by a shaft 42 supported in bearings 44 and 46 on sides 12 and 14 drives a chain 43 which drives a wheel 41 on shaft 35.

Each of a pair of upright guides 58 and 60 on the sides 12 and 14 has respective slots 62 and 64 therein. The pair of slots 62 receive a stop bar 66 while the slots 64 receive an escapement bar 68. Respective uprights 70 and 72 on the sides 12 and 14 carry brackets 74, each of which brackets supports a stop bar adjusting arm 76 and an escapement actuating arm 78. Respective links 80 and 82 pivotally connect arms 76 and 78 to the ends of the bars 66 and 68. We provide the arm 76 adjacent side 14 with an extension 84 which pivotally supports a bell crank 86. A link 88 connects one arm of the bell crank 86 to the end of arm 78. A link 90 connects the other bell crank arm to the armature 92 of a solenoid 94. Arm 76 also carries a shaft 96 which rides in an arcuate slot 98 in a plate 100. A knob 97 threaded on the end of shaft 96 permits the position of the shaft in slot 98 to be adjusted to position the bars 66 and 68 to accommodate box bottoms of various heights. A bracket 95 supports the solenoid 94 on the arm 78 for movement therewith readily to permit adjustment of bar 68.

From the structure just described, it will be apparent that a box bottom fed to the conveyor 22 is carried by the conveyor to a point at which the front of the box is engaged by the escapement rod 68. Rod 66 is so positioned with respect to the rod 68 that it overlies a box bottom in engagement with the escapement bar 68. As will be described hereinafter, when a box bottom is to be released for engagement with a lid, solenoid 94 is energized to rotate bell crank 86 in a clockwise direction as viewed in FIGURE 1 to pivot arm 78 slightly in a counterclockwise direction to lift the bar 68 a sufficient distance to free the box bottom. Shaft 42 carries accelerating rolls 38 and 40 which accelerate a bottom leaving the escapement mechanism 54.

Referring now to FIGURES 1 to 5 and 8, shaft 42 also carries for rotation therewith a pulley 106 carrying a timing belt 108 provided with a plurality of lugs 110 adapted to engage the rear of a box bottom to move the bottom to a position at which it can engage a lid. Belt 108 also extends around a timing belt pulley 112 carried by a shaft 114 supported in bearings 116 and 118 in the sides 12 and 14. A bracket 120 carried by the front frame 16 supports a drive motor 122 which when energized drives a speed reducer 124, the output shaft 126 of which carries a sprocket wheel 128 for driving a pitch chain 130 which drives a sprocket wheel 132 on shaft 114. Shaft 114 carries a second sprocket wheel 134 which drives a pitch chain 136 in engagement with a sprocket wheel 138 on a shaft 140 rotatably supported in bearings 142 and 144 carried by the machine frame. Shaft 140 carries a cam 146 having a flat 148 thereon which is engaged by a follower 150 to permit a microswitch 152 to close once during each revolution of shaft 140. As will be explained hereinafter, switch 152 permits the release of a box bottom by the escapement bar 68 in timed relation to the arrival of a lug 110 at a position at which it can engage the rear of a box bottom.

The uprights 70 and 72 carry bearings 154 and 156 which rotatably support a shaft 158. Shaft 158 has oppositely threaded portions 160 and 162 extending outwardly from the center of the shaft. The respective portions 160 and 162 receive threaded bosses 164 and 166 on lid guide side plates 168 and 170 provided with flanges 172 and 174 down which lids are guided in a manner to be described. It will readily be apparent that if shaft 158 is turned, the side plates 168 and 170 will move together either toward or away from each other. Shaft 158 carries a sprocket wheel 176 adapted to be driven to make this adjustment. Side plates 168 and 170 support a blower assembly indicated generally by the reference character 178 adapted to supply air to a duct 180. We form a plurality of spaced openings 182 along the top of the duct 180 to create a flow of air which assists in moving lids down along the guides 172 and 174. An adjustable damper 183 permits the air flow to be regulated. A feeler 184 on a shaft 186 carried by a bracket 188 on side wall 170 is adapted to sense the presence of at least two lids on the guides 172 and 174. When a second lid is present, it moves the arm 184 to rotate the cam 190 to a position at which it actuates a follower 192 to close a microswitch 194.

Vertically extending slots 189 in the respective plates 168 and 170 receive studs 191 on an anti-shingle bracket 193 extending across the width of the machine above the conveyor 22. Any suitable means such as knobs (not shown) on the studs permit the height of bracket 193 to be adjusted. As will be explained hereinafter, this bracket 193 prevents a bottom moving from conveyor 22 to the timing belt from tilting to permit a following bottom to move thereunder where relatively shallow bottoms are being handled.

We provide the side plates 168 and 170 with a pair of spring arms 454 which hold the lids down as they move along the flanges 172 and 174 on the side guides 168 and 170.

Referring now to FIGURES 2, 4 and 5, a pair of spaced uprights 196 and 198 carry bearings 200 and 202 which rotatably support a shaft 204. Shaft 204 has oppositely threaded portions 206 and 208 which receive threaded blocks or plates 210 and 212 riding in slots 214 and 216 in the right and left front lid guides 218 and 220 of our machine. In response to rotation of shaft 204, when a sprocket wheel 222 is driven in a manner to be described, guides 218 and 220 move toward or away from each other.

The central portion of shaft 204 between the threaded portions 206 and 208 passes through a vertically extending opening in a front guide adjusting plate 226 secured to a lid top guide member 228. Collars 224 on the shaft 204 position the plate 226. We thread a lead screw 230 into the top of the plate 226 and turn the screw down until it engages the shaft 204 thus to adjust the height of the front end of guide 228.

We pivotally support the ends of a V-frame 232 on the ends of shaft 204. Extension 234 at the apex of the V-frame carries a pin 236 which rides in an opening 238 in an adjusting frame 240 secured to the rear end of the guide 228. A lead screw 242 carried by an arm 244 on frame 232 is adapted to engage a lug 246 on the upright 198 to permit adjustment of the position of the frame 232 to limit the upward movement of the guide 228 against the influence of gravity as a lid is being applied to a box in a manner to be described.

Referring now to FIGURES 2, 4 and 6, our machine includes a pair of adjustable uprights 248 and 250 located intermediate the ends of the machine. T-heads 252 and 254 at the lower ends of the uprights are received in a T-slot 256 in a support 257 secured by any suitable means, such as a screw 258, to a lift rod 260 slidably supported in cross frame members 262 and 264. The adjustable uprights 248 and 250 have respective slots 266 and 268 adjacent their upper ends. Each of the slots 266 and 268 receives a pivot pin 270 which extends through the slot, through a bifurcated extension 272 on the front end of one of the guide plates 168 or 170 and into the rear end of one of the front lid guides 218 or 220. It will readily be apparent that when the uprights are raised, the members 168 and 170 will swing about the axis of shaft 158 while the members 218 and 220 swing about the axis of the shaft 204. The slide plates 210 and 212 permit this movement of the members 218 and 220 while the slots in extensions 272 of the members 168 and 170 permit that movement of those members.

A bottom being moved by a pusher 228 first engages fixed centering spring guides 273 and 275 carried by plates 168 and 170. These guides 273 and 275 center the box and impede its progress slightly so that a lid will be ready to receive it when it arrives at the assembling zone. The right and left front lid guides 218 and 220 carry respective centering rails 274 and 276 pivotally supported on pins 278 and 280 on the members 218 and 220. Springs 282 carried by the numbers 218 and 220 normally urge the centering rails 274 and 276 to move inwardly to positions at which a lid traveling down the guides 168 and 170 will rest upon these centering rails while a box bottom having been released by the escapement will be moved to a position at which it passes between the rails so that its sides are squeezed inwardly thereby.

A bearing 284 on the machine frame supports a screw 288 adapted to be rotated by a crank 286 to move a nut 290 inwardly and outwardly with respect to the side of the frame. Nut 290 carries a pin 292 which rides in a slot 294 in one arm of a bell crank 296 pivotally supported on a pin 298. The other arm of bell crank 296 has a slot 300 which receives a follower pin 302 secured to the bar 260.

From the structure just described, it will be apparent that when screw 288 is turned bell crank 296 is rotated in one direction or the other to raise or lower the adjustable uprights 248 and 250, thereby to raise or lower the centrally located ends of plates 168 and 170 and guides 218 and 222.

Respective bearings 304 and 306 on the machine frame rotatably support a shaft 308 having oppositely threaded portions 310 and 312 extending outwardly from the center of the shaft. A crank 314 is adapted to be actuated manually to rotate shaft 308. Threaded shaft portions 310 and 312 carry respective T-nuts 316 and 318 which ride in corresponding T-slots in the upper ends of the blocks 320 and 322 on the heads 252 and 254. Now, when shaft 308 is rotated, the uprights 248 and 250 move toward or away from each other to accommodate boxes of different widths.

Referring now to FIGURES 1 to 6, we provide our machine with means for adjusting the spacing between plates 168 and 170 and between guides 218 and 220 concomitantly with the adjustment of the spacing between uprights 248 and 250. The end of shaft 308 outboard of the bearing 306 carries a sprocket wheel 324 for driving a pitch chain 326 adapted to drive a sprocket wheel 328 on a shaft 330. Shaft 330 carries another sprocket wheel 332 adapted to drive a pitch chain 334. Chain 334 extends around an idler sprocket wheel 336 to an idler sprocket wheel 338 rotatably supported on the frame adjacent the rear thereof and up and around the sprocket wheel 176 on shaft 158. Chain 334 then extends downwardly around an idler sprocket wheel 340 carried by the upright 70, over into engagement with a chain adjusting sprocket wheel 342 and from the wheel 342 to an idler sprocket wheel 344 on the front frame and thence upwardly and around the sprocket wheel 222 on the shaft 206. From sprocket wheel 222 chain 334 extends around an idler sprocket wheel 346 on the front frame and back to the wheel 332.

From the driving arrangement just described, it will readily be apparent that when the handle 314 is turned to drive shaft 308, both shaft 158 and shaft 204 will be driven. Thus, all the side guide members, including the right- and left-hand side plates 168 and 170, the right- and left-hand adjustable uprights 250 and 248, as well as the right- and left-hand front guides 218 and 220 will be moved toward or away from each other to accommodate boxes of different widths.

Referring now to FIGURE 7, we have shown an enlarged view of one of the lugs 110 carried by the timing belt 108. We so shape the lug as to provide a box-rear-engaging-surface 348 which extends forwardly of the base. Owing to this arrangement the box bottom will be engaged at a point above the base of the bottom so as to cause the rear wall of the box, if bowed, to straighten or bend slightly inwardly thus to provide more clearance for the lid as it moves into position over the bottom. We also provide the lug top with a bevel 350 to ensure that a fully telescoping lid will slide down across the face of the lug between the surface 348 and the rear wall of the box bottom and not come to rest on top of the lug.

From the structure described thus far and from the descritpion of the operation of our apparatus given hereinafter, it will be appreciated that box bottoms lying on their bases and carrying lids are delivered from the front of the lidding section of the apparatus. It is often desirable for ease in packing the boxes that they be delivered to the packer on their sides so that the lid can be partially separated from the box bottom, the goods can be placed therein and the lid and bottom again brought together for delivery to a location at which, for example, they can be packed in groups in larger cartons.

Referring now to FIGURES 9 and 10, we may associate with the lidder unit a packing table assembly indicated generally by the reference character 352. This unit 352 is disposed immediately adjacent the front of the lidder unit so that it receives assembled bottoms and lids directly therefrom. The apparatus 352 includes a receiving table 354 carried by a frame including uprights 356, 358, 360, 362, 364 and 366 connected by suitable cross frame members such, for example, as members 368, 370, 372 and so forth. Cover plates may be provided as necessary or desirable. We form the table 354 with a plurality of slots 374. A plurality of positioning elements 376 may be secured in slots 378 disposed at suitable locations on the table 354.

It will readily be apparent that a box bottom 380 carrying a lid 382 and shown in *phantom* in FIGURES 9 and 10 is delivered by the lidder unit to the table 354. We provide the packing unit with a shaft 384 rotatably supported in bearings 386 and 388 carried in the frame sides. Shaft 384 carries for rotation therewith a plurality of oppositely extending arms 390 and 392 disposed at spaced locations along the shaft. A shaft 394 supported in bearing brackets 396 and 398 on the machine frame is coupled by a right angle drive unit 400 to the shaft 384. A sprocket wheel 402 carried by the shaft 394 for rotation therewith is driven by a pitch chain 404 extending from a sprocket wheel 406 on the drive shaft 140, for example, of the lidder unit and extending around sprocket wheels 408 and 410. In this manner we transmit power from the lidder unit to the packing table 352. As shaft 384 rotates, the arms 390 and 392 move up through the slots 374 to engage the bases of the box bottoms to carry the assembled bottoms and lids upwardly onto an adjustable platform 412 provided with a plurality of slots 414 which register with the slots 374 to permit the passage of the arms 390 and 392 therethrough. It is to be understood that as the assembled boxes and lids are raised from the table 354 to the platform 412, they are automatically turned through ninety degrees so as to rest on their sides. We provide the packing table with a brush 416 carried by holder 418, the vertical position of which can be adjusted by a pair of lead screws 420 and 422 adapted to be actuated by knobs 424 and 426. It will readily be apparent that as the assembled boxes and lids are turned on their sides and are moved onto the platform 412, their progress will be impeded by the brush 416 until ultimately a plurality of boxes disposed on their sides build up in an area indicated generally by the reference character 428 at which they can manually be removed from the packing table 352. Preferably we form the arms 390 and 392 from a resilient material which, while being sufficiently rigid to carry lidded boxes, is sufficiently flexible to permit the arms to yield if the boxes jam so that the latter will not be torn or marked. A suitable material is molded nylon.

Referring now to FIGURE 11, we have shown one particular form of electrical circuit which can be employed to control the operation of our apparatus. We connect respective conductors 430 and 432 to terminals 434 and 436 of a suitable source of power. Respective normally open switches 438 and 440 are adapted to be closed to connect motor 122 across the conductors 430 and 432. A relay winding 442 is adapted to be energized in response to operation of a push button switch 444 to close switches 438 and 440 and to close a switch 446 to complete the holding circuit for winding 442 through a normally closed push button switch 448 which may be operated to stop the apparatus.

As has been pointed out hereinabove, motor 122 drives cam 146 as indicated schematically by the broken line 450 in FIGURE 11. Cam 146 has a flat 148 which is engaged by a follower 150 to permit a switch 152 to close once for each revolution of the cam. In a particular embodiment of our apparatus, switch 152 is permitted to close sixty times a minute. We connect the lid sensing switch 194, a normally open switch 452 responsive to winding 442, switch 152 and winding 94 in series between the conductors 430 and 432. Thus, with at least two lids present, with winding 442 energized, solenoid 94 receives a pulse each time switch 152 closes.

In setting our apparatus up for operation, we first make the required adjustments for handling a box of the size to be lidded. We achieve this result by making five quick adjustments. First, considering the width of the box, we turn crank 314 to adjust all of the side guides including the right and left guide walls 168 and 170 and the right and left front lid guides 218 and 220. At the same time, as has been explained hereinabove, the adjustable uprights 248 and 250 are moved to positions at which the distance separating them corresponds to the proper box width. We next set the top lid guide or closure bar 228 to the box height. This is readily achieved by turning the lead screw 230. At the same time we can adjust the lead screw 242 for the limit position of the member 228. In the position of the parts of the apparatus shown in the drawings, they are set to handle what would be a very shallow box. When an adjustment is made the parts move for example to the broken line position shown in FIGURE 2.

When the operations just described have been completed, we adjust the escapement mechanism 54 to position the bar 68 at the correct height to be engaged by a bottom advanced thereto by the conveyor 22, with the stop bar 66 positioned just above the top of the bottom. This adjustment is achieved by moving the rod 96 in the slot 98 until the pairs of arms 76 and 78 have been pivoted through a sufficient distance properly to position the escapement bar 68 and the stop bar 66. It is necessary, also, that the anti-shingle bracket properly be positioned.

After adjustment of the escapement mechanism, we then set the chute comprising the flanges 172 and 174 at such an angle that the bottom will just clear the ends of the chute. We also adjust the fan air fed by blower 178 to duct 180 to give the correct air pressure properly to assist gravity in moving the lids down the chute.

When all of the adjustments described above have been accomplished, we operate push button 444 to energize winding 442 to close switches 438 and 440 to energize the motor 122. The relay winding 442 also closes switch 446 to complete the relay holding circuit through switch 448. Switch 452 closes to enable the escapement circuit. When these operations have been accomplished, lids are fed to the chute formed by flanges 172 and 174. Under the influence of gravity, assisted by the flow of air from duct 180, the lids move downwardly along the flanges until the lowermost of the lids rests on the upper edges of the two centering rails 274 and 276. Boxes are fed from a suitable supply to the conveyor 22 to a position at which the leading box engages the escapement bar 68. With the parts in this position, once in the course of each revolution of cam 146, switch 152 closes. Owing to the fact that an adequate supply of lids is present, switch 194 is closed and when switch 152 closes, solenoid 94 receives a pulse.

As will be apparent from the explanation advanced hereinabove, switch 152 closes when a bottom is properly positioned with reference to one of the lugs 110 on the timing belt so as to permit the surface 348 on the lug to engage the back of the bottom. Accelerating rolls 38 and 40 accelerate the released bottom toward the timing belt. The timing belt then carries the bottom forward until it engages the lid whose leading edge is resting on the rails 274 and 276. As the bottom moves into the space between the rails 274 and 276, its sides are squeezed together slightly and at the same time the lug 110 engages the back of the bottom to bow it inwardly slightly. These two operations greatly facilitate movement of the lid onto the bottom. Now the bottom and the lid move together along with the timing belt under the top lid guide or closure bar 228 which rests by gravity on the top of the lid. Ultimately, as the bottom and the lid move out of the front of the lidding apparatus 10, the lid is closed firmly on the bottom.

Assembled lids and bottoms are fed to the table 354. Owing to the connection between the lidding unit drive shaft and shaft 384, the latter is driven in synchronism with the operation of the lidder so that a box resting on the base of the bottom and carrying a lid received by the table 354 is carried upwardly onto the platform 412. In the course of this operation, the assembled bottom and lid are turned on their sides. As a plurality of assembled bottoms and lids build up on the platform 412, their progress is retarded by brush 416 and ultimately a number of boxes build up in the area 428 until they can easily be handled.

In a practical embodiment of our apparatus, we operate the switch 152 sixty times a minute to cause our apparatus to accomplish 60 lidding operations a minute. If, after a particular run, a different size box is to be used, the apparatus is rapidly and expeditiously set up to handle this new size by making the adjustments outlined above. The bevel 350 assures that a fully closed lid will not rest on top of a lug 110 but can be completely closed on a bottom.

It will readily be seen that the surface along which bottoms are moved by the timing belt is somewhat lower than the surface along which the bottoms are moved by the conveyor 22. Our anti-shingle bracket prevents a narrow bottom from moving in under a preceding narrow bottom which has tilted forward in moving from conveyor 22 to the timing belt. This operation is achieved by the fact that the trailing edge of the first bottom is prevented from moving upwardly by the anti-shingle bracket until it is very nearly entirely carried by the timing belt.

The stop bar 66 serves to prevent a bottom being released from being carried upwardly with the escapement bar 68 as the latter moves upwardly in response to its actuation.

It will be seen that we have accomplished the objects of our invention. Our box lidder assembles lids on bottoms in a rapid and expeditious manner. It is readily adjustable to accommodate a wide range of box sizes. Our box lidder overcomes minor imperfections in bottoms and lids. It presents lidded boxes so oriented as to facilitate subsequent handling of the boxes. We provide our lidder with means for synchronizing the release of a bottom with the movement of a driving conveyor. Our lidder has means for preventing shingling of relatively shallow bottoms.

It will be understood that certain features and subcombinations are of utility and may be employed without reference to other features and subcombinations. This is contemplated by and is within the scope of our claims. It is further obvious that various changes may be made in details within the scope of our claims without departing from the spirit of our invention. It is, therefore, to be understood that our invention is, therefore, to be understood that our invention is not to be limited to the specific details shown and described.

Having thus described our invention, what we claim is:

1. Box lidding apparatus for assembling lids on box bottoms in an assembly zone including in combination a frame having a pair of side walls, means adjacent one pair of side wall ends mounting said side walls in adjustably spaced relationship for adjustable pivotal movement, a pair of guide rails, means mounting said guide rails in adjustably spaced relationship in said zone for adjustable pivotal movement adjacent one pair of ends thereof in the terminal portion of said zone, means on said side walls for guiding a lid to a position at which its front edge is supported by said rails to permit said lid to be engaged by a box bottom being fed to said zone, a first conveyor for feeding bottoms to said position, escapement means releasably holding a bottom against movement under the influence of said first conveyor, a second conveyor for receiving bottoms from said first conveyor, means on said second conveyor for engaging a bottom received from said first conveyor and for carrying it through said zone, means for driving said second conveyor, means responsive to said drive means for actuating said escapement to release a bottom in synchronism with the arrival of said bottom engaging means at a position at which it can engage a bottom, a top lid guide, means mounting said top lid guide for pivotal movement adjacent one end thereof in the terminal portion of said zone whereby said top lid guide rests by gravity on a lid being carried through said zone by a bottom, means for concomitantly actuating said adjustable mounting means to vary the spacing between said walls and said rails, means for concomitantly adjusting the height of the other pair of side wall ends and the other pair of rail ends, means for adjusting the height of said one end of said top lid guide, means for adjusting the angular position of said top lid guide, means for squeezing the sides of a box bottom entering said zone, and means for producing a stream of air for urging a lid to move along said side wall guide means.

2. Box lidding apparatus for assembling lids on box bottoms in an assembly zone including in combination a frame having a pair of side walls, means adjacent one pair of side wall ends mounting said side walls in adjustably spaced relationship for adjustable pivotal movement, a pair of guide rails, means mounting said guide rails in adjustably spaced relationship in said zone for adjustable pivotal movement adjacent one pair of ends thereof in the terminal portion of said zone, means on said side walls for guiding a lid to a position at which its front edge is supported by said rails to permit said lid to be engaged by a box bottom being fed to said zone, a first conveyor for feeding bottoms to said position, escapement means releasably holding a bottom against movement under the influence of said first conveyor, a second conveyor for receiving bottoms from said first conveyor, means on said second conveyor for engaging a bottom received from said first conveyor and for carrying it through said zone, means for driving said second conveyor, means responsive to said drive means for actuating said escapement to release a bottom in synchronism with the arrival of said bottom engaging means at a position at which it can engage a bottom, a top lid guide, means mounting said top lid guide for pivotal movement adjacent one end thereof in the terminal portion of said zone whereby said top lid guide rests by gravity on a lid being carried through said zone by a bottom, means for concomitantly actuating said adjustable mounting means to vary the spacing between said walls and said rails, means for concomitantly adjusting the height of the other pair of side wall ends and the other pair of rail ends, means for adjusting the height of said one end of said top lid guide, means for adjusting the angular position of said top lid guide, means for receiving lidded boxes from said second conveyor, a table, means for delivering lidded boxes from said receiving means to said table on their sides and means for synchronizing lidded box delivering means with said second conveyor.

3. In box lidding apparatus for assembling lids on boxes in an assembly zone, means providing a surface for receiving lidded boxes from said zone at a first level, a table having a surface at a level above said first level, said receiving means surface and said table having aligned slots, a shaft, an arm in a fixed position on said shaft, means mounting said shaft for rotary movement in a fixed position with relation to said surface and said table, rigidly connected to said shaft for movement therewith and in aligned relationship with said slots and means for driving said shaft to move a lidded box from said receiving means to said table while rotating said box to deliver said box to said table on its side.

4. In box lidding apparatus for assembling lids on boxes in an assembly zone, means providing a surface for receiving lidded boxes from said zone at a first level, a table having a surface at a level above said first level, said receiving means surface and said table having aligned slots, a shaft, means mounting said shaft for rotary movement in a fixed position with relation to said surface and said table, an arm formed of resilient material, means rigidly connecting said arm to said shaft for movement therewith in aligned relationship with said slots and means for driving said shaft to move a lidded box from said receiving means to said table while rotating said box to deliver said box to said table on its side.

5. In a box lidding apparatus for assembling lids on box bottoms in an assembling zone, a first conveyor for advancing bottoms to a location spaced from and in advance of said assembling zone, a second conveyor for receiving bottoms from said first conveyor at said location and for advancing said bottoms into and through said zone and a stationary member extending across said first conveyor at a distance thereabove slightly greater than the height of one of said bottoms adjacent the discharge end thereof for preventing tilting of bottoms as they pass from said first conveyor to said second conveyor.

6. In a box lidding apparatus for assembling lids on box bottoms in an assembling zone a first conveyor for advancing bottoms to a location spaced from and in advance of said assembling zone a second conveyor for receiving bottoms from said first conveyor at said location and for advancing said bottoms into and through said zone, a stationary member extending across said first conveyor at a distance thereabove slightly greater than the height of one of said bottoms adjacent the discharge end thereof for preventing tilting of bottoms as they pass from said first conveyor to said second conveyor and means for adjusting the height of said member over said conveyor.

7. In a box lidding apparatus for assembling lids on box bottoms in an assembly zone a conveyor for feeding bottoms to said zone, an escapement abutment extending across the width of said conveyor, means mounting said escapement abutment adjacent said conveyor for movement between a position at which it engages a bottom on said conveyor across the width of the front of the box to correct any misalignment thereof and a position at which it is out of the path of a bottom on said conveyor and means for moving said abutment between said positions.

8. In a box lidding apparatus for assembling lids on box bottoms in an assembly zone a conveyor for feeding bottoms to said zone, an escapement abutment, means mounting said escapement abutment adjacent said conveyor for movement between a first position at which it arrests a bottom on said conveyor and a second position at which it is out of the path of a bottom on said conveyor, means for moving said abutment between said positions, drive means for said conveyor, said drive means comprising a shaft, and comprising a cam on said shaft for actuating said moving means to hold said abutment in said second position until a bottom passes thereby.

9. In a box lidding apparatus for assembling lids on box bottoms in an assembly zone a conveyor for feeding bottoms to said zone, an escapement bar, means mounting said escapement bar over said conveyor for movement between a position at which it arrests a bottom on said conveyor and a position at which it is out of the path of a bottom on said conveyor, means for moving said escapement bar between said positions, a stop bar and means mounting said stop bar over said conveyor at a location above a bottom arrested by said escapement bar to prevent a bottom from moving with said escapement bar as the latter moves to its position out of the path of a bottom.

10. In a box lidding apparatus for assembling lids on box bottoms in an assembly zone a conveyor for feeding bottoms to said zone, an escapement bar, means mounting said escapement bar over said conveyor for movement between a position at which it arrests a bottom on said conveyor and a position at which it is out of the path of a bottom on said conveyor, means for moving said escapement bar between said positions, a stop bar, means mounting said stop bar over said conveyor at a location above a bottom arrested by said escapement bar to prevent a bottom from moving with said escapement bar as the latter moves to its position out of the path of a bottom and means for concomitantly adjusting the positions of said escapement bar and stop bar.

11. In a box lidding apparatus for assembling lids on bottoms in an assembly zone a first conveyor for supporting and carrying bottoms toward said zone, a second conveyor for supporting and carrying bottoms through said zone, means mounting said second conveyor at generally the same level as said first conveyor to permit said second conveyor to receive bottoms from said first conveyor, an escapement for releasably holding bottoms on said first conveyor, bottom engaging means comprising a lug on said second conveyor, actuating means for said escapement, drive means comprising a shaft for said second conveyor and means comprising a cam on said shaft for synchronizing the operation of said actuating means with the arrival of a bottom engaging means at a location at which it may engage a bottom released by said escapement 12. In a box lidder having an assembly zone in which lids are assembled on bottoms an inclined chute for guiding lids along a generally downwardly inclined path to said zone and means located below said chute for producing a flow of air in the direction toward which said path is downwardly inclined to urge lids to move along said chute.

13. In a box lidder having an assembly zone in which lids are assembled on bottoms an inclined chute along which lids move along a generally downwardly inclined path toward said zone, an air manifold extending along the bottom of said chute, a plurality of openings in said manifold and means for forcing air into said manifold to produce jets of air through said openings in the direction toward which said path is downwardly inclined to urge lids to move along said chute.

14. In a box lidding apparatus a pair of guide walls, means adjacent one pair of guide wall ends mounting said walls in spaced relationship for pivotal movement, a pair of guide rails, means adjacent one pair of guide rail ends mounting said guide rails in spaced relationship for pivotal movement with the other ends thereof adjacent the other ends of said walls and common drive means for concomitantly adjusting the height of said other ends of said guide walls and adjusting the height of said guide rails.

15. In a box lidding apparatus a pair of guide walls, adjustable means mounting said walls in spaced relationship for pivotal movement adjacent one end thereof, a pair of guide rails, adjustable means mounting said guide rails in spaced relationship adjacent one end thereof with the other ends thereof adjacent the other ends of said walls, first common drive means for concomitantly adjusting the height of said other ends of said guide walls and said guide rails and second drive means for concomitantly actuating said adjustable means to vary the spacing between said guide rails and said guide walls.

16. In a box lidding apparatus for assembling lids on bottoms in an assembly zone means positioning a lid for engagement by a bottom being fed to said zone, means for feeding a bottom through said zone to cause said bottom to engage said lid and carry it through said zone, a top lid guide, and means mounting said guide for pivotal movement adjacent one end thereof whereby said guide rests by gravity on a lid being moved through said zone by a bottom.

17. In a box lidding apparatus as in claim 16 means for adjusting the height of said one end of said top lid guide.

18. In a box lidding apparatus as in claim 16 means for adjusting the angular position of said guide.

19. Apparatus for placing lids from a supply on bottoms from a supply of bottoms formed of a material having a certain resilience including in combination means for releasably holding a lid from said supply in a position to be engaged by a bottom advanced along a predetermined path, means for advancing a bottom along said predetermined path and through a position at which it engages said lid to draw said lid out of said holding means and onto said bottom and respective elements mounted in spaced relationship at the sides of said path adjacent said position for movement toward and away from said path and means for biasing said elements to move toward said path with a force greater than said resilience to deform the sides of a bottom moving thereby to squeeze the sides of said bottom together as it moves through said position along said path.

20. Apparatus for assembling first and second members from respective supplies to form a box including in combination means for releasably holding a first member from the first member supply in a position to be engaged by a second member advanced along a predetermined path, a conveyor for advancing the second member along said path and through a position at which it engages the first member, means for accelerating the second member from said second member supply to said conveyor, releasable means for restraining the second member against movement under the influence of said accelerating means and means responsive to the presence of the first member in said holding means and responsive to said conveyor for releasing said restraining means to permit said accelerating means to feed the second member to said conveyor to permit said conveyor to move said second member along said path to draw the first member out of said holding means and onto said second member to form a box.

21. In a box lidding apparatus a pair of guide walls, first adjustable means mounting said walls in spaced relationship, a pair of guide rails, second adjustable means mounting said guide rails in spaced relationship with said rails aligned with said walls to provide an assembly station at adjacent ends of the rails and walls, and a common drive means for concomitantly operating said first and second adjustable means to adjust the spacing between said walls and the spacing between said rails.

22. Apparatus as in claim 21 including a second common drive means for concomitantly adjusting the height of adjacent ends of said rails and said walls.

References Cited by the Examiner

UNITED STATES PATENTS

| | | | |
|---|---|---|---|
| 1,571,269 | 2/1926 | Jaeger | 53—313 |
| 2,669,377 | 2/1954 | Van Poolen et al. | 53—314 XR |
| 2,869,300 | 1/1959 | Stover | 53—313 XR |
| 2,909,876 | 10/1959 | McGihon | 53—159 |
| 2,942,395 | 6/1960 | Thoren | 53—316 |
| 3,000,154 | 9/1961 | Stickelber | 53—74 |
| 3,053,025 | 9/1962 | Nigrelli et al. | 53—244 XR |
| 3,099,120 | 7/1963 | Bruun | 53—313 |
| 3,100,957 | 8/1963 | King et al. | 53—67 |
| 3,122,870 | 3/1964 | Stemmler | 53—159 XR |

FOREIGN PATENTS 355,394  8/1961  Switzerland.

TRAVIS S. McGEHEE, *Primary Examiner.*

BERNARD STICKNEY, FRANK E. BAILEY,
A. E. FOURNIER, *Examiners.*